Sept. 9, 1930.                J. J. FRANK                1,775,091
                                 VALVE
                            Filed June 7, 1929
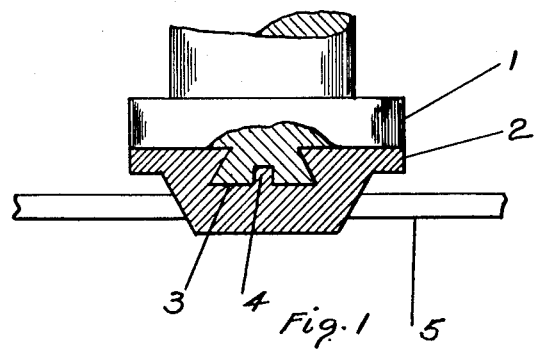
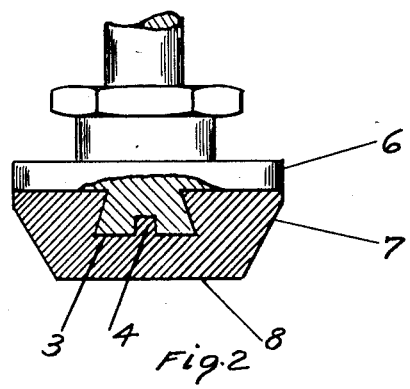
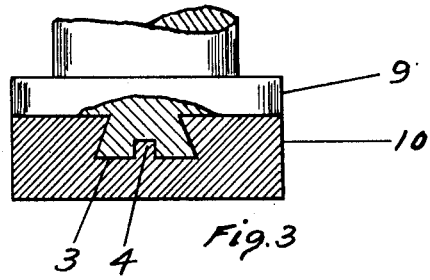
INVENTOR
JOHN J. FRANK
BY
Oscar J. DeWitt
ATTORNEY Patented Sept. 9, 1930

1,775,091

UNITED STATES PATENT OFFICE

JOHN J. FRANK, OF PITTSFIELD, MASSACHUSETTS

VALVE

Application filed June 7, 1929. Serial No. 369,240.

The object, construction, and operation of my improved valve are herein set forth with sufficient clearness to enable those skilled in the art to which it appertains, to make and use the same.

My invention relates to an improvement in valves and particularly to a specially constructed valve adapted to effect a tight joint to prevent leakage of fluids and gases, such as air, steam, water, and especially oils when the valve is seated.

Valves as ordinarily made comprise a metal seal upon which rests a disc. The disc is usually made of molded composition and is inserted in a container commonly known as a disc holder or clapper, and the disc is retained in the disc holder by means of a nut usually called the "disc nut." With valves of this nature there is nothing to prevent leakage through the main members, and frequently leakage is experienced when the fluids are of exceptionally low viscosity. Valves are also made, comprising a phenolic condensation material covered with a vulcanized rubber facing adhesively and permanently secured to the outer surface of the phenolic condensation cementing material and with valves of this nature exposed to high temperature a slow, partial vulcanizing takes place to such an extent that the disc adheres to the disc holder to such a degree which not infrequently results in damage to the disc holder or its entire loss.

In my invention I provide a tight valve, which preferably consists of a valve disc composed of phenolic condensation material, and a valve plate constructed of metal, and the valve disc is so constructed that the phenolic composition seats against the valve plate and is connected thereto, with no projecting edges or openings therein, thus providing a valve disc that is substantially waterproof and impervious to oil or moisture and unaffected by high temperature. My invention further consists in the novel manner of mounting the phenolic composition on the valve plate so that no leakage can occur therethrough.

Referring to the accompanying drawings wherein similar characters of reference indicate corresponding parts throughout the several views Figure 1 is a transverse section through a form of valve.

Figure 2 is a transverse section through another form of valve.

Figure 3 is a transverse section through another form of valve.

As indicated in Figure 1 the valve plate or support 1 may consist of any desired metal, and has a conical extension 3 depending therefrom with the base of the cone provided with a slot 4 to facilitate the union of the phenolic condensation material to form the body 2 of the valve. This particular valve is constructed with a flange which is flush with the perimeter of the valve plate 1. The phenolic composition is applied in a plastic state so that it may be molded under pressure on the valve plate 1 and around the conical extension 3 and form the body 2 and the flange of the valve of some such shape as indicated, which body and flange are held in contact with the valve plate 1 around the conical extension of the valve plate. This form of valve is well adapted for use on small valves, as it is substantially leakage proof, and the pressure on the body of the valve bears directly on the valve plate thereby providing a substantial and uniform support for the valve body and flange. A valve seat 5 is shown in cooperation with the valve.

Another arrangement is shown in Figure 2 in which the phenolic composition which forms the body of the valve 7 is molded in a plastic state in a similar manner to Figure 1 on the valve plate 6 and around the conical extension 3 which is also provided with a slot 4 to facilitate the union of the phenolic condensation material to form the body of the valve 7. The valve 7 is adapted for use on large valves and has a large face area 8, and the pressure on the valve 7 bears directly on the surface of the valve plate 6 thereby providing a substantial and uniform support for the valve 7.

Figure 3 shows another arrangement of a valve 10 which is preferably composed of phenolic condensation material with the perimeter of the valve flush with the valve plate 9 and may be of any desired configuration.

What I claim is:

1. A valve comprising a metallic valve plate having a conical extension depending therefrom, a conical shaped valve with a flange flush with the perimeter of the valve plate and the whole bearing directly against the valve plate and composed of phenolic condensation material, the phenolic condensation material cooperating with the valve plate and the conical extension to form the valve and attach the valve to the valve plate.

2. A valve comprising a metallic valve plate having a conical extension depending therefrom with a slot in the base of the cone, a conical shaped valve with a flange flush with the perimeter of the valve plate and composed of phenolic condensation material molded about the conical extension and bearing directly against the valve plate to prevent leakage from the valve plate through the valve.

3. A valve comprising a metallic valve plate having a conical extension depending therefrom, a conical shaped valve flush with the perimeter of the valve plate and the whole bearing directly against the valve plate and composed of phenolic condensation material, the phenolic condensation material cooperating with the valve plate and the conical extension to form the valve and attach the valve to the valve plate.

4. A valve comprising a metallic valve plate having a conical extension depending therefrom with a slot in the base of the cone, a conical shaped valve flush with the perimeter of the valve plate and composed of phenolic condensation material molded about the conical extension and bearing directly against the valve plate to prevent leakage from the valve plate through the valve.

5. A valve comprising a metallic valve plate having a conical extension depending therefrom with a slot in the base of the cone, a valve with the perimeter flush with the perimeter of the valve plate and composed of phenolic condensation material molded about the conical extension and bearing directly against the valve plate to prevent leakage from the valve plate through the valve.

6. A valve comprising a metallic valve plate having a conical extension depending therefrom with a slot in the base of the cone, a valve with the perimeter flush with the perimeter of the valve plate and the whole bearing directly against the valve plate and composed of phenolic condensation material, the phenolic condensation material cooperating with the valve plate and the conical extension to form the valve and attach the valve to the valve plate.

In testimony whereof I affix my signature.

JOHN J. FRANK.